United States Patent [19]

Bensch

[11] Patent Number: 5,687,813
[45] Date of Patent: Nov. 18, 1997

[54] VEHICLE BOARDING DEVICE

[75] Inventor: Christopher J. Bensch, Livonia, Mich.

[73] Assignee: The United States of America as represented by the Secretary of the Army, Washington, D.C.

[21] Appl. No.: 762,576

[22] Filed: Dec. 9, 1996

Related U.S. Application Data

[63] Continuation-in-part of Ser. No. 540,364, Oct. 6, 1995.
[51] Int. Cl.⁶ .................................. B60R 3/00; B60R 3/02
[52] U.S. Cl. ............................ 182/127; 182/163; 280/166
[58] Field of Search ............................ 182/127, 206, 182/106, 95, 97, 229, 163; 280/163, 166

[56] References Cited

U.S. PATENT DOCUMENTS 590,149  9/1897  Harrington ............................ 182/206 X

FOREIGN PATENT DOCUMENTS 6-24273  2/1994  Japan ................................... 280/166

*Primary Examiner*—Leslie A. Braun
*Assistant Examiner*—Long Dinh Phan
*Attorney, Agent, or Firm*—Peter A. Taucher; Gail S. Soderling

[57]   ABSTRACT

The invention shows a detachable ladder for use with a military and similar vehicles. The ladder has an adjustable mounting apparatus allowing the ladder to be attached to a wide variety of vehicle tailgates. The ladder also has hand holds to be used by personnel entering the vehicle when encumbered with combat gear.

1 Claim, 3 Drawing Sheets

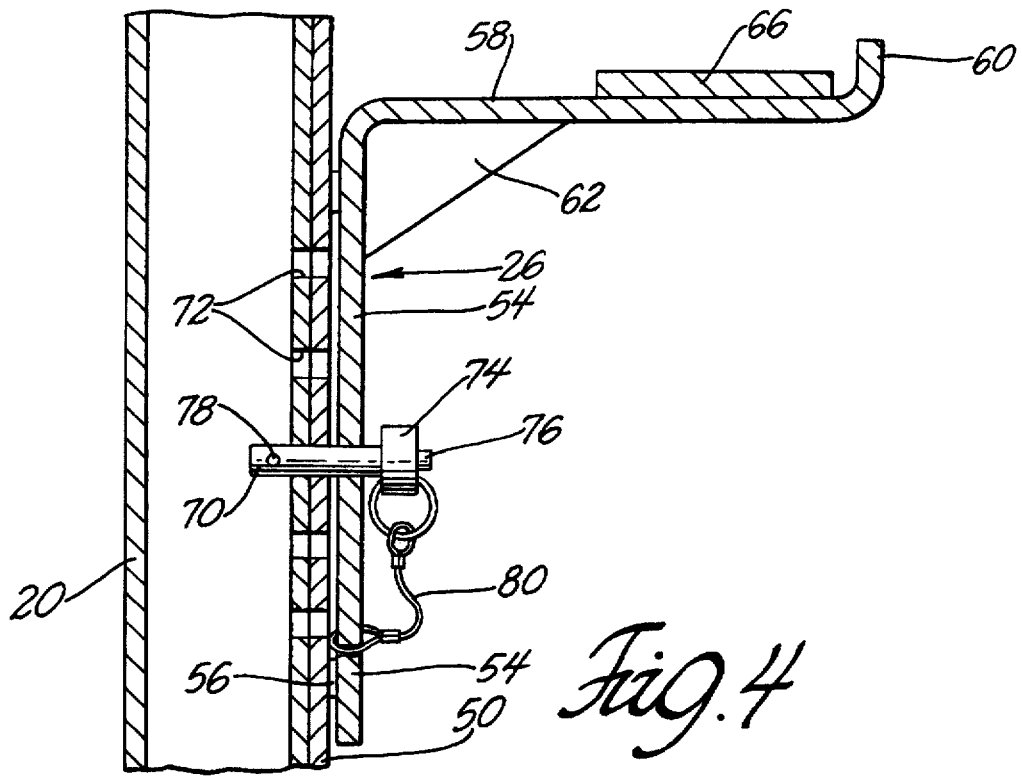
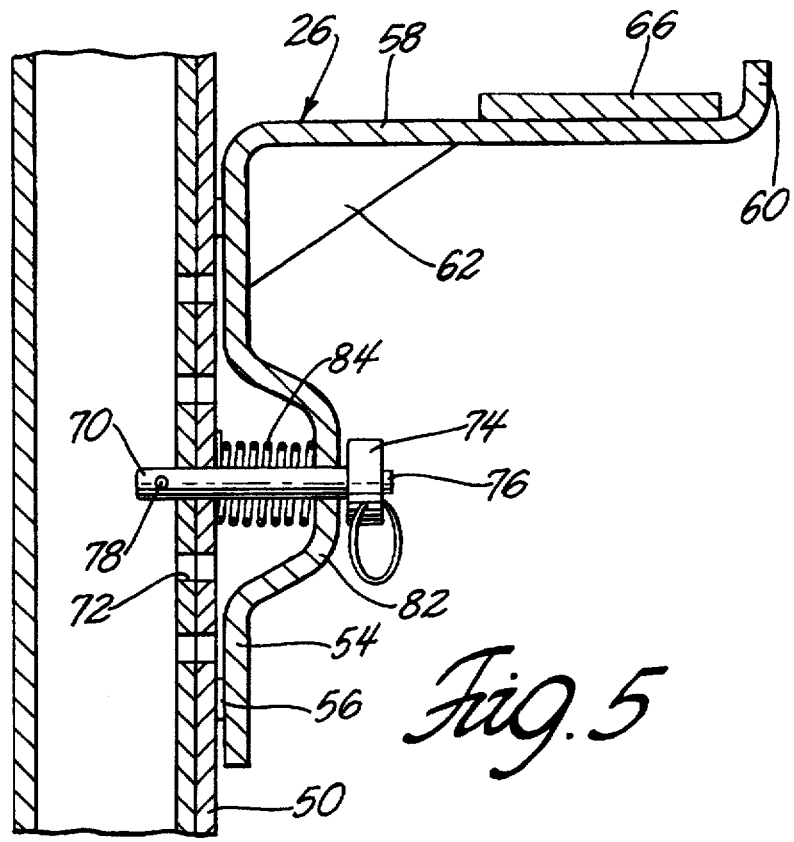

VEHICLE BOARDING DEVICE

CROSS REFERENCES TO RELATED APPLICATIONS

This application is a continuation in part of copending U.S. application Ser. No. 08/540,364, filed Oct. 6, 1995.

GOVERNMENT INTEREST

The invention described herein may be manufactured, used and licensed by or for the Government for governmental purposes without payment to me of any royalty.

BACKGROUND OF THE INVENTION

1. Field of the Invention

This invention relates to vehicle accessories.

2. Prior Art

Ladders which can be hung or otherwise deployed on a vehicle or other location are known. In particular, ladders are placed over the side of boats to allow entry to the boat from the water.

Military vehicles cargo vehicles are used to carry troops as well as cargo. Such vehicles are made in a wide variety of sizes and configurations. As such they have different tail gate configurations and cargo bed heights depending on the truck being used. Presently the most common means of ingress to a vehicle cargo bed is to install a bracket on the tailgate for use as a combination handle and step. Troops entering the vehicle can step on the bracket and then onto the cargo bed. This configuration presents several problems. First, the bracket/step is generally high off the ground making it difficult for many troops, particularly shorter troops, to use the step. Secondly, the step from the tail gate to the cargo bed is also a large step. The problems are compounded when the troops are carrying full battle gear which can weigh 75 or more pounds. The additional weight negatively effects balance and adds considerably to the troops girth. The lack of a hand hold or balance renders this configuration less than desirable. The result is difficulty in entering and exiting the vehicle which increases the time necessary to load and unload the vehicle and increases the chances of a mishap. Since military vehicles may be used in hostile environments, time and ease of use are of prime importance.

It would be desirable to have an attachable ladder which can be deployed or attached to a variety of different vehicle tail gates to allow easy ingress and egress by troops carrying battle gear, and which can be stored in place during transportation. Further, the ladder should be easily removed using simple tools when no longer need.

BRIEF SUMMARY OF THE INVENTION

The problems of the prior art structures are alleviated by the improved boarding device of the present invention. Briefly, the boarding device, or adjustable gangway ladder structure is a removable structure suitable for attachment to a variety of different vehicles having tailgates to facilitate ingress and egress of persons. The device includes a first section having a pair of parallel side rails which are attached to the tailgate of the vehicle. A plurality of connecting spoke members are firmly attached to the side rails, the spokes serving to hold the side rails in a spaced parallel configuration and providing a plurality of easily accessed steps for use in boarding the vehicle. Each of the side rails has a fixed C-shaped bracket member attached near or at one end of the side rail. Each side rail also has an adjustable bracket attached to the same side of the side rail as the fixed bracket. The adjustable brackets are moveable longitudinally along the side rail so as to cooperate with the fixed C-shaped bracket member to form a gap therebetween which will retain the vehicle tail gate between the brackets. The brackets in cooperation serve to hold the side rails transversely across the tail gate with the spokes providing steps allowing ingress and egress to the cargo hold.

Extensions are attached to the side rails, one extension being rotatably fastened to each side rail. The rotatable attachment allows the extensions to be rotated between a deployed position for troop usage and an undeployed, storage position for travel. One extension is attached to the outside of its associated side rail near the rail's end so as to enclose the side rails between the extensions. Each extension has a handle member attached to the end of the extension opposite the end attached to the side rails, the handle extending inwards towards the vehicle when the extensions are in the deployed position. The extensions have a brace attached to and extending between the extensions. The brace is located near the ends of the extensions which are attached to the side rails. In the deployed position, the brace will contact the vehicle to provide additional stability to the structure. In the undeployed position, the brace will extend across the collapsed structure and provide a handle to be used in deploying the extensions to their deployed position.

BRIEF DESCRIPTION OF THE DRAWING

In the accompanying drawing:

FIG. 4 is side view in section of the adjustable bracket of FIG. 3; and

FIG. 5 is a second adjustable structure useful in the practice of this invention

DETAILED DESCRIPTION OF PREFERRED EMBODIMENTS

Figure 1:
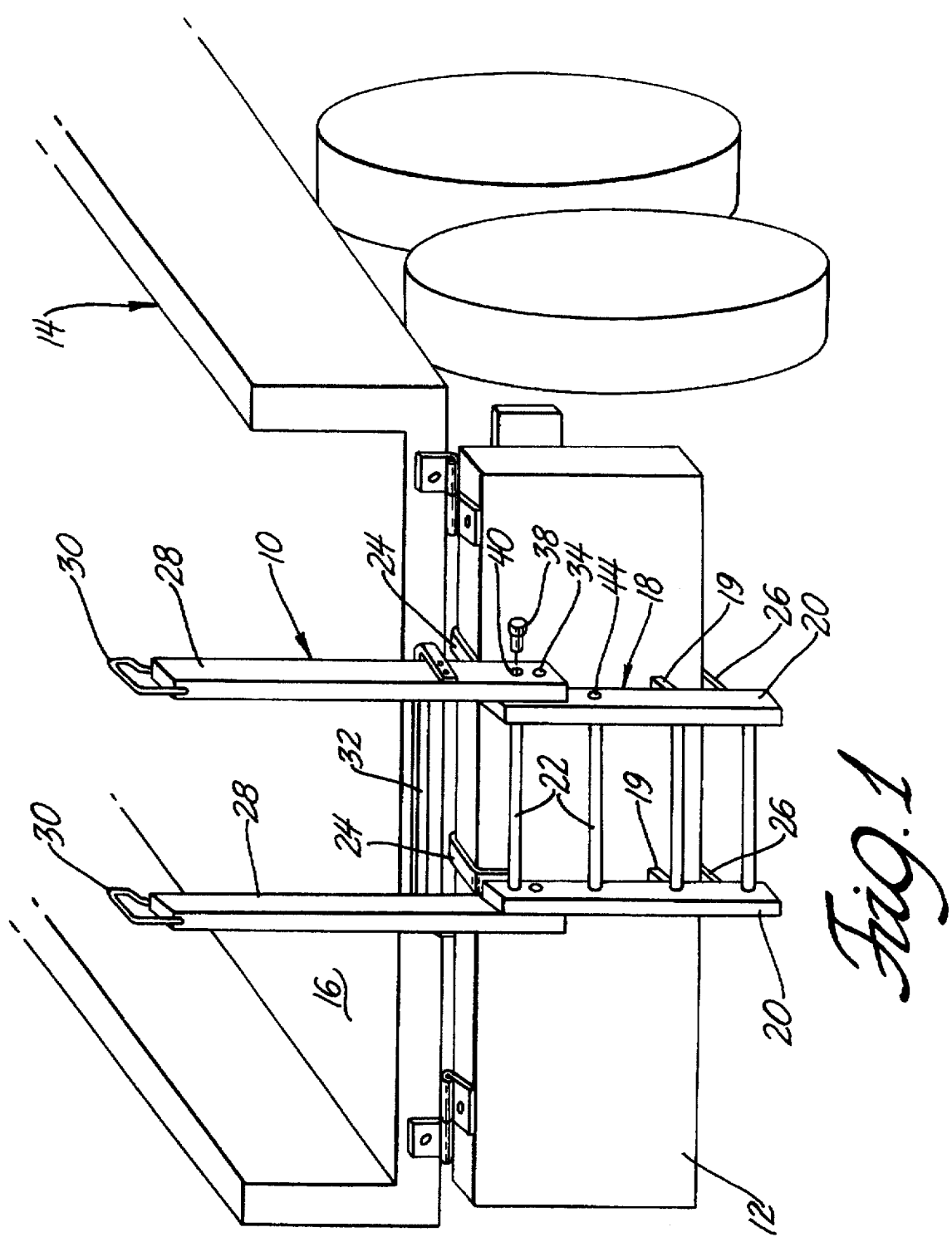
FIG. 1 a perspective view of one embodiment of this invention in the deployed position on a vehicle.

Referring to the drawing in which like numerals denote like parts, a boarding ladder or device according to this invention is designated generally 10. The boarding ladder or adjustable gangway 10 provides a ladder structure which can be attached to a variety of different vehicles. It is shown attached to the tailgate 12 of a medium weight truck 14 such as a 5 ton flat bed cargo vehicle. The boarding ladder 10 will facilitate ingress and egress of persons to the flat bed cargo area 16 for use as a troop transport.

The boarding ladder 10 includes a first section 18 with a pair of parallel side rails 20. A plurality of spokes 22 are attached to and extend between the side rails 20 to maintain the side rails in a parallel configuration and provide a plurality of easily accessed steps for use in boarding the vehicle 14. The side rails 20 are off set from the tailgate sufficiently that the spokes 22 are removed from the tailgate's surface sufficiently to provide enough room for a person's foot to get good purchase on a spoke when entering or leaving the vehicle. Each of the side rails 20 as viewed has a fixed C-shaped bracket 24 permanently attached near or at the upper end of the side rail 20 when the tailgate 12 is down and the boarding ladder 10 is deployed as shown in FIG. 1. One arm of the fixed C-shaped brackets 24 is rigidly fastened to the side rails 20 using various fastening means such as threaded fasteners, rivets or weldments. The C-shaped brackets 24 are attached with the free arm of the bracket opposite the arm attached to the side rail extending longitudinally back along the body of the side rail 20 to form the first part of a gripping mechanism for the ladder.

An adjustable bracket 26 is also mounted on each side rail 20. The adjustable brackets 26 are movably attached to the side rail 20 and the free arm of the bracket extends longitudinally along the side rail in the direction of the fixed bracket to form a space therebetween. The adjustable bracket 26 is mounted to the side rail in a manner which allows the adjustable bracket to be moved longitudinally to cooperate with the fixed C-shaped bracket forming an adjustable sized gap to fit a variety of different tail gates. The vehicle tail gate 12 will be firmly gripped between the brackets 24, 26 holding the ladder firmly in position.

Figure 3:
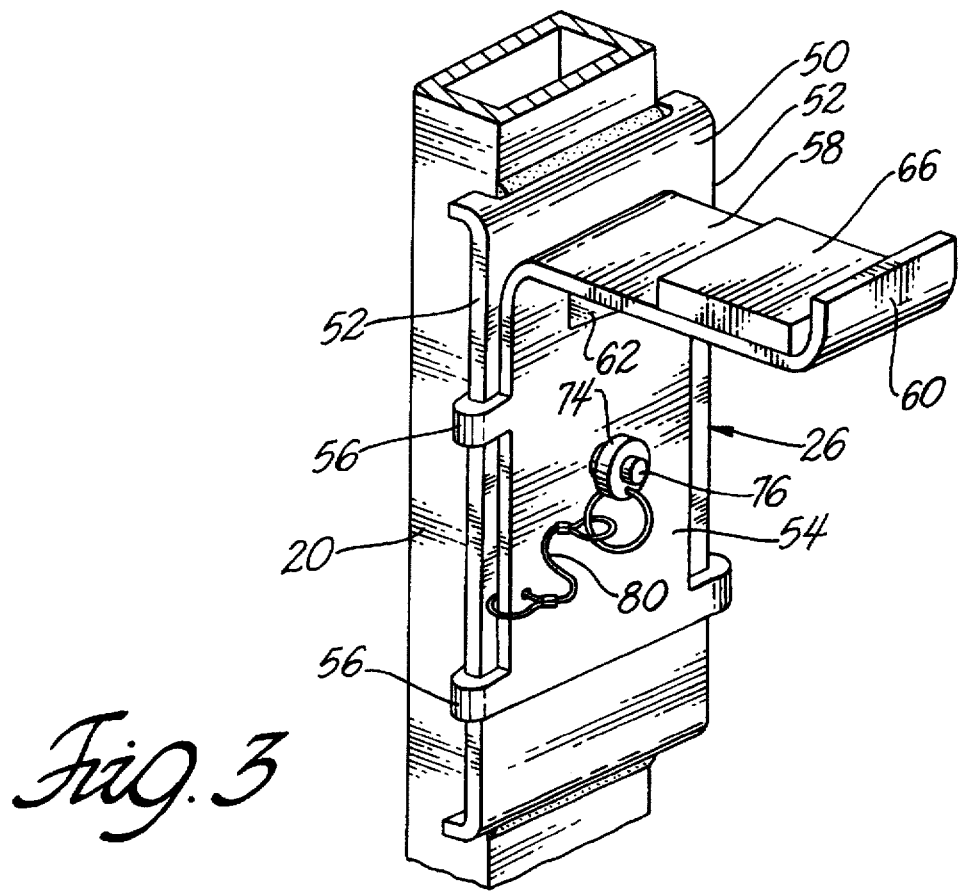
FIG. 3 is an isometric view of one adjustable structure useful in the practice of this invention.

One example of an adjustable bracket structure is shown in greater detail in FIGS. 3 and 4. In these figures, the adjustable bracket 26 has a backing plate 50 permanently attached to the side of the rail 20 such as by welding. The backing plate 50 is wider than the side rail 20 so it extends past the surface of the side rail and forms flanges 52. The flanges 52 provide a surface which can be gripped to allow the remainder of the bracket to be attached and adjusted. The bracket 26 has a moveable bracket member having a first leg 54 which extends parallel to and lies along side the backing plate 50. The first leg 54 has four claws 56, one on each corner, the claws extending outward from the first leg to enfold a portion of the backing plate the four claws cooperating to hold the first leg parallel to the backing plate while allowing the first leg to move longitudinally along the backing plate and with respect to the side rail. The adjustable member has a second leg 58 which extends perpendicularly to the first leg 54 in the direction away from the side rail 20, the second arm having a third arm 60 extending towards the C-shaped bracket 24. A gusset 62 can be attached to the first and second legs 54, 58 to maintain them in a perpendicular configuration. An elastomeric pad 66 is attached to the third arm to provide some additional adjustment the compression and expansion of the pad serving to help maintain the bracket tight on the tailgate 12 when installed.

The first arm 54 has an aperture sized to hold a pin 70 and the side rail 20 and backing plate 50 have a plurality of apertures 72 formed along their longitudinal axes. The aperture in first arm can be aligned with one of the apertures 72 and the pin 70 inserted to hold the bracket 26 in the desired position. The pin 70 shown is push pin detent ring type structure where a collar 74 can be grasped and the portion of the pin 70 designated 76 pushed inward to release ball detents 78 located on the other end of the pin located on the inside of the side rail 20. This allows the pin 70 to be easily removed from the apertures to allow removal of the ladder from the tail gate and easy adjustment to fit on the new tailgate. The structure of such rings is known in the art. As shown the push pin detent ring has a lanyard 80 having one end attached to the collar 74 and the other end attached to the first arm 54 so the pin does not get lost.

A variation is shown in FIG. 5 where the first leg 54 has a boss 82 formed in the first leg the boss being formed so as to extend away form the backing plate and containing the aperture in the first leg. The boss 82 serves to enclose a spring 84 coaxially aligned with the pin 70 the spring being located in the void defined by the boss and the backing plate 50. In this variant, when the extension 76 is pushed the spring 84 will force the pin 70 away from the backing plate 50 and the side rail 20 to make extraction of the pin easier. Other variations of mounting means allowing adjustability will be apparent to those skilled in the art and further examples will not be given in the interest of brevity.

The adjustment feature allows a variation in the distance between the brackets to facilitate gripping a variety of vehicle tail gates to which the device should be attached. This allows a single device to be used on the whole range of military vehicles.

Figure 2:
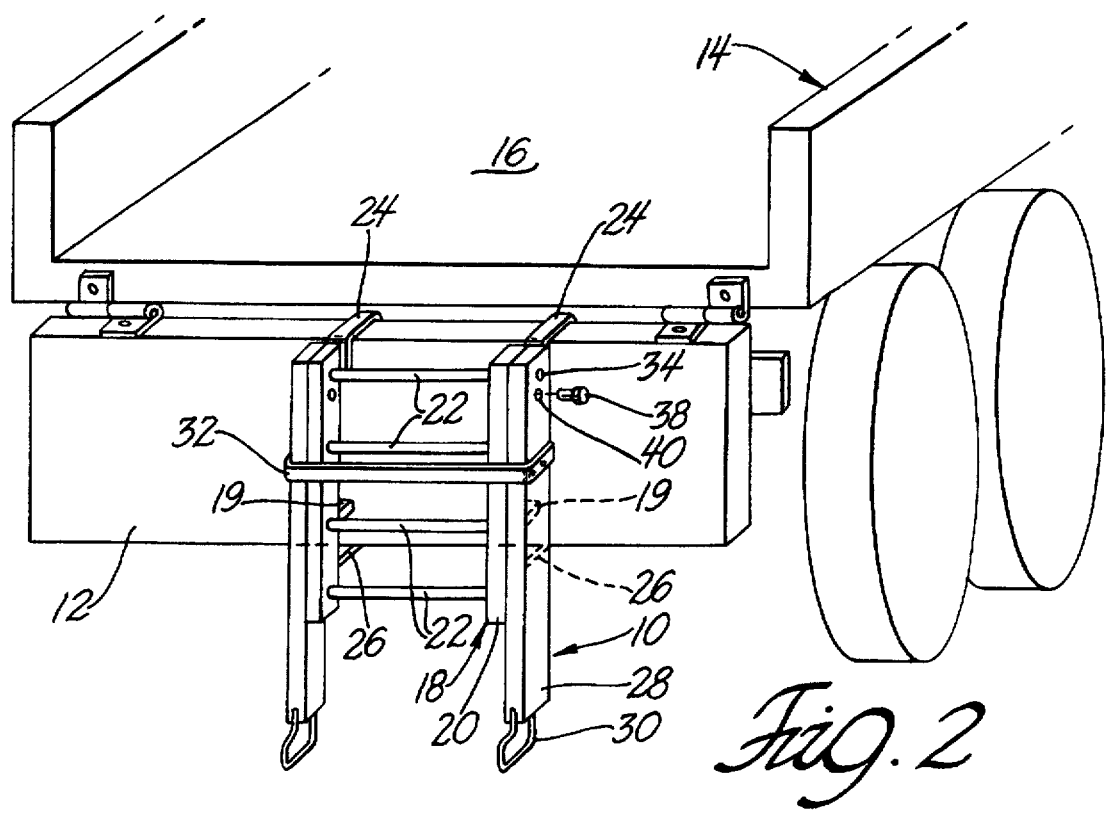
FIG. 2 is a perspective view of the embodiment of FIG. 1 in the undeployed position.

A pair of extensions 28 are attached to the side rails 20, one of the extensions being rotatably fastened to each side rail near its end. The rotatable attachment allows the extensions 28 to be rotated between a deployed position shown in FIG. 1 and a storage position shown in FIG. 2. Each extension 28 has a handle member 30 attached to the end of the extension opposite the end attached to the side rails 20, the handle 30 extending inwards towards the vehicle 14 when the extensions 28 are in the deployed position. A brace 32 is attached to the extensions 28 and extends transversely between the extensions to provide additional stability to the structure. The brace 32 is located near the ends of the extensions 28 which are attached to the side rails 20. In the deployed position, the brace 32 will contact the vehicle 14 body to help position the extensions 28. In the undeployed or traveling position, the brace 32 will extend transversely across the extensions 28 and side rails 20. When the ladder is to be deployed the brace 32 will provide a convenient handle to move the extensions 28 upward to the desired position.

The extensions 28 as shown are mounted on axles 34 passing through the extension 28 and side rail 20 to provide a means to rotate the side rail and its associated extension with respect to each other. When extension 28 is in the deployed position, a threaded fastener 38 or pin can be inserted in aperture 40 in the extension extending though a complimentary aperture not shown in the side rail 20 to lock the extension in the desired position. When the ladder is placed in the folded undeployed position then the fastener 38 can be passed through aperture 40 and a complimentary aperture 44 in side rail 20 to hold the side rail in the undeployed position.

Various modifications and alterations will become apparent to those skilled in the art with out departing from the scope and spirit of this invention and it is understood that this invention is not limited to the illustrative embodiments set forth above.

What is claimed is:

1. A removable adjustable gangway ladder structure suitable for attachment to a variety of different vehicles to facilitate ingress and egress of persons including: a first section having a pair of parallel side rails, a plurality of connecting spoke members attached thereto the spoke members being firmly attached to the side rails and serving to hold the side rails in a spaced parallel configuration, a pair of C-shaped bracket members, one C-shaped bracket member being disposed on each side rail, the C-shaped bracket members being located on one end of the side rails, a second pair of adjustable brackets, the adjustable brackets being mounted on the side rails, each adjustable brackets being moveable longitudinally along its associated side rail and being disposed so as to cooperate with the C-shaped bracket member to form a way to retain a portion of the vehicle, the adjustable bracket being mounted to the side rail in a manner which allows the variation of the distance between the brackets to facilitate gripping the vehicle portion to which the structure is attached, the brackets serving to maintain the gangway ladder extending transversely across the tail gate, and a pair of extensions, one extension being rotatably fastened to the outer side near the end of each side rail so as to enclose the side rails between the extensions, each extension having a handle member attached to the end of the extension opposite the end fastened to the side rails, the handle extending inwards towards the vehicle when the extensions are in a deployed position, and a brace attached to and extending transversely between the extensions juxtaposed the rotatable fastening means the brace being juxtaposed a portion of the vehicle in the deployed position and extending transversely to the extensions and side rails when in the undeployed position.

* * * * *